United States Patent
Hiroto et al.

(10) Patent No.: US 12,346,872 B2
(45) Date of Patent: Jul. 1, 2025

(54) PRODUCT SALES SYSTEM

(71) Applicant: Nomura Research Institute, Ltd., Tokyo (JP)

(72) Inventors: Kenichiro Hiroto, Tokyo (JP); Haruki Shimada, Tokyo (JP); Kojiro Kato, Tokyo (JP)

(73) Assignee: Nomura Research Instituted, Ltd., Tokyo (JP)

( * ) Notice: Subject to any disclaimer, the term of this patent is extended or adjusted under 35 U.S.C. 154(b) by 942 days.

(21) Appl. No.: 17/466,585

(22) Filed: Sep. 3, 2021

(65) Prior Publication Data

US 2022/0164767 A1 May 26, 2022

(30) Foreign Application Priority Data

Nov. 26, 2020 (JP) .................................. 2020-196288
Nov. 26, 2020 (JP) .................................. 2020-196289

(51) Int. Cl.
*G06Q 10/087* (2023.01)
*B25J 9/00* (2006.01)
(Continued)

(52) U.S. Cl.
CPC .......... *G06Q 10/087* (2013.01); *B25J 9/0093* (2013.01); *B25J 9/162* (2013.01);
(Continued)

(58) Field of Classification Search
CPC .......... G06Q 10/087; G06Q 10/06315; G06Q 20/18; G06Q 30/0633; G06V 10/10;
(Continued)

(56) References Cited

U.S. PATENT DOCUMENTS 10,311,564 B2 * 6/2019 Konishi .................. G06T 7/001
10,604,344 B2 * 3/2020 Testa ..................... G07F 11/165
(Continued)

FOREIGN PATENT DOCUMENTS

CN 109712323 A 5/2019
CN 109927033 A 6/2019
(Continued)

OTHER PUBLICATIONS

Japanese patent publication No. JP-2007109140, "Merchandise Purchase System", Abe Kazuaki (Year: 2007).*
(Continued)

*Primary Examiner* — Ernesto A Suarez
*Assistant Examiner* — Laurence R Brothers
(74) *Attorney, Agent, or Firm* — RANKIN, HILL & CLARK LLP

(57) ABSTRACT

A store server and a picking robot are included. The store server includes an order reception unit that receives an order for a product from a customer terminal, and a picking processing unit that instructs the picking robot to pick a product related to the order from a display shelf and convey the product to a delivery locker. The picking robot includes an arm, a picking means installed at a tip end portion of the arm, and a sensor installed near the tip end portion of the arm, detects an object by image processing from an image of a display level on which the product is displayed, the image being photographed by the sensor, identifies which object the product is by image recognition processing based on a recognition model set for each product regarding each object, and moves the picking means to a position where the product can be picked.

4 Claims, 9 Drawing Sheets

(51) Int. Cl.

| | |
|---|---|
| *B25J 9/16* | (2006.01) |
| *B25J 11/00* | (2006.01) |
| *B25J 13/08* | (2006.01) |
| *B25J 15/00* | (2006.01) |
| *B25J 15/06* | (2006.01) |
| *B25J 19/02* | (2006.01) |
| *B65G 1/04* | (2006.01) |
| *B65G 1/137* | (2006.01) |
| *G06K 7/10* | (2006.01) |
| *G06Q 10/0631* | (2023.01) |
| *G06Q 20/18* | (2012.01) |
| *G06Q 30/0601* | (2023.01) |
| *G06V 10/10* | (2022.01) |
| *G06V 20/10* | (2022.01) |

(52) U.S. Cl.
CPC ........... *B25J 9/1661* (2013.01); *B25J 9/1697* (2013.01); *B25J 11/008* (2013.01); *B25J 13/08* (2013.01); *B25J 15/00* (2013.01); *B25J 15/0616* (2013.01); *B25J 19/021* (2013.01); *B65G 1/0492* (2013.01); *B65G 1/1373* (2013.01); *B65G 1/1376* (2013.01); *G06K 7/10861* (2013.01); *G06Q 10/06315* (2013.01); *G06Q 20/18* (2013.01); *G06Q 30/0633* (2013.01); *G06V 10/10* (2022.01); *G06V 20/10* (2022.01); *G05B 2219/50391* (2013.01); *Y10S 901/01* (2013.01)

(58) Field of Classification Search
CPC ......... G06V 20/10; B25J 9/0093; B25J 9/162; B25J 9/1661; B25J 9/1697; B25J 11/008; B25J 13/08; B25J 15/00; B25J 15/0616; B25J 19/021; B65G 1/0492; B65G 1/1373; B65G 1/1376; G05B 2219/50391; Y10S 901/01; G06K 7/10861
See application file for complete search history.

(56) References Cited

U.S. PATENT DOCUMENTS

| | | | | |
|---|---|---|---|---|
| 2016/0129592 | A1* | 5/2016 | Saboo | B25J 5/007 |
| | | | | 700/248 |
| 2020/0061839 | A1* | 2/2020 | Deyle | G06Q 10/087 |

FOREIGN PATENT DOCUMENTS

| | | | | |
|---|---|---|---|---|
| JP | 2007109140 | A | * | 4/2007 |
| JP | 2009271815 | A | * | 11/2009 |
| JP | 2018087083 | A | * | 6/2018 |
| JP | 2019-21283 | A | | 2/2019 |
| KR | 102099622 | B1 | * | 4/2020 |

OTHER PUBLICATIONS

Japanese patent publication No. JP-2009271815, "Shopping System and Shopping Support Method", Akima et al. (Year: 2020).*
Japanese patent publication No. JP-2018087083, "Picking Facility and Physical Distribution Facility", Nakayama Takayuki—merged global dossier translation and original Japanese document (Year: 2018).*
OCS online article "Advantages and disadvantages of different conveyor systems" (Year: 2019).*
KR-102099622-B1 (Year: 2020).*
Tomizawa et al., "Remote Food Shopping Robot System in a Supermarket-Realization of the shopping task from remote places", International Conference on Mechatronics and Automation, 2007, total 7 pages; Cited in Australian Examination Report.
Causo et al., "Visual marker-guided mobile robot solution for automated item picking in a warehouse", International Conference on Advanced Intelligent Mechatronics, 2017, total 7 pages; Cited in Australian Examination Report.
Australian Examination Report dated Jun. 30, 2022 for Australian Patent Application No. 2021229176.
Experimental start of "unmanned late-night hours operation", [online], Mar. 29, 2019, News Release, Lawson, Inc., Retrieved from the Internet: <URL:https://www.lawson.co.jp/company/news/detail/1369017_2504.html>, Total 6 pages; Cited in Specification; English translation.

* cited by examiner

| PRODUCT MASTER DB |
|---|
| PRODUCT ID |
| PRODUCT NAME |
| TYPE |
| UNIT PRICE |
| WEIGHT |
| UNMANNED SALES AVAILABILITY |
| RECOGNITION MODEL |
| SIMILAR PRODUCT ID |
| ... |

| STOCK DB |
|---|
| PRODUCT ID |
| STOCK QUANTITY |
| DISPLAY QUANTITY |
| DISPLAY SHELF ID |
| DISPLAY LEVEL |
| ... |

| LOCKER DB |
|---|
| LOCKER NUMBER |
| STATUS |
| STATUS UPDATE DATE AND TIME |
| ORDER ID |
| ... |

| ORDER DB |
|---|
| ORDER ID |
| USER ID |
| PRODUCT ID |
| PURCHASE QUANTITY |
| PAYMENT AMOUNT |
| PAYMENT STATUS |
| ORDER DATE AND TIME |
| CORRESPONDING ROBOT ID |
| SCHEDULED DELIVERY DATE AND TIME |
| ORDER STATUS |
| ... |

PRODUCT SALES SYSTEM

BACKGROUND

Technical Field

The present invention relates to a technology for selling a product in a real store, and particularly relates to a technology effective when applied to a product sales system for selling a product in an unmanned real store.

Related Art

In the retail industry including convenience stores, convenience has been provided to customers by extending opening hours such as late-night and early-morning operation and 24-hour operation, and sales and revenue have been increased by increasing use opportunities. However, due to progress of the low birth rate and aging of population, decrease in working population of young people in particular, and so forth, shortage of manpower in the retail industry is serious, and it is difficult to secure manpower that can work particularly late at night and early in the morning. Thus, the cost required for securing manpower for late night and early morning hours is high, but the number of customers is small and the sales is smaller than that in the daytime, and hence, there is a movement to shorten the opening hours by stopping opening 24 hours or opening late at night and early in the morning.

In response to such a situation, it is also considered to open a store late at night and early in the morning by operating the store in an unmanned manner without requiring manpower. For example, JP 2019-021283 A discloses an unmanned store system including an authentication device that performs biometric authentication of a user, a gate controller that opens a gate so that the user can enter or exit a store when the authentication is performed, and an unmanned register device that performs biometric authentication of the user to settle a commodity amount. In addition, "Start of experiment of "unmanned operation in late-night hours"", [online], Mar. 29, 2019, Lawson, Inc., [searched on Oct. 18, 2020], Internet <URL: www.lawson.co.jp/company/news/detail/1369017_2504.html> describes a demonstration experiment of unmanned operation in late-night hours at a convenience store.

According to the conventional technology, it is also possible to perform unmanned operation only in hours where it is difficult to secure manpower late at night and early in the morning while performing normal operation in the daytime in an existing retail store without providing a dedicated selling place, a product receiving place, a device for unmanned sales such as a vending machine, and the like. However, in a mechanism for allowing customers to enter an unmanned store, there is a limit in reducing security and crime prevention risks no matter how much measures are taken.

Therefore, an object of the present invention is to provide a product sales system that enables unmanned operation outside manned opening hours without allowing a customer to enter the store.

The above-described and other objects and novel features of the present invention will be clarified by the description herein and the attached drawings.

SUMMARY

The outline of a representative one of the inventions disclosed in the present application will be briefly described as follows.

A product sales system that is a representative embodiment of the present invention is a product sales system that sells a product displayed on a display shelf in a store to a customer outside manned opening hours of the store, the product sales system including: a store server that includes an information processing system; and a picking robot that is movable in the store, in which the store server includes an order reception unit that receives an order of a product from an information processing terminal of the customer via a network, and a picking processing unit that instructs the picking robot to pick the product related to the order from the display shelf and convey the product to a predetermined delivery place.

The picking robot includes an arm that is able to move a tip end portion to a desired position, a picking means for picking a product, the picking means being installed at the tip end portion of the arm, and a sensor having an image-capturing function, the sensor being installed near the tip end portion of the arm, detects one or more objects by image processing from an image of a display level of the display shelf on which the product related to the order is displayed, the image being photographed by the sensor, identifies which of the objects the product related to the order is by image recognition processing based on a recognition model set for each product with respect to each object, and moves the picking means to a position where the product related to the order is able to be picked.

A product sales system is a product sales system that sells a product displayed on a display shelf in a store to a customer outside manned opening hours of the store, the product sales system including: a store server that includes an information processing system; a picking robot that is movable in the store; and a delivery place where a product is able to be delivered inside/outside the store, in which the store server includes an order reception unit that receives an order of a product from an information processing terminal of the customer via a network, and a picking processing unit that instructs the picking robot to pick the product related to the order from the display shelf and convey the product to the delivery place. The picking robot includes an arm that is able to move a tip end portion to a desired position, a picking means for picking a product, the picking means being installed at the tip end portion of the arm, and a product conveyance table that holds a product picked by the picking means on a placement surface, the placement surface including a belt conveyor, and the product conveyance table conveys a product held on the placement surface to the delivery place by operating the belt conveyor at the delivery place.

Advantageous effects of the invention disclosed in the present application that are achieved by a representative embodiment will be briefly described as follows.

That is, according to a representative embodiment of the present invention, it becomes possible to perform unmanned operation outside manned opening hours without allowing a customer to enter the store.

BRIEF DESCRIPTION OF DRAWINGS

FIG. 8 is a diagram showing an outline of an example of a data configuration of a product master DB in an embodiment of the present invention;

FIG. 9 is a diagram showing an outline of an example of a data configuration of a stock DB in an embodiment of the present invention;

FIG. 10 is a diagram showing an outline of an example of a data configuration of a locker DB in an embodiment of the present invention;

FIG. 11 is a diagram showing an outline of an example of a data configuration of an order DB in an embodiment of the present invention.

DETAILED DESCRIPTION

An embodiment of the present invention will be described in detail below with reference to the drawings. In all the drawings for describing the embodiment, identical parts are in principle given identical reference signs, and duplicated descriptions thereof will be omitted. Meanwhile, a part described with a reference sign in a figure may be referred to with the same reference sign in the description of another figure although not illustrated again.

<Outline>

A product sales system that is an embodiment of the present invention implements a service that enables sales of a product to a customer by making the operation outside opening hours (e.g., night-time such as late at night, early morning, holidays, and year end and new year holidays) unmanned with a robot in a real store that sells a product to a customer such as a convenience store, a department store, a supermarket, a drug store, a complex commercial facility, a bookstore, and a store. Here, "opening hours" refers to hours in which a person on the store side such as a store staff member performs an operation such as selling a product, and "outside opening hours" refers to hours other than the "opening hours" described above. According to the present embodiment, since sales of a product to the customer becomes possible by the robot even "outside opening hours", it can be regarded as "opening" hours. Therefore, hours in which a store staff member performs an operation (corresponding to conventional "opening hours") may be referred to as "manned opening hours", and hours in which a robot performs an operation (corresponding to conventional "outside opening hours") may be referred to as "unmanned opening hours" below.

In the present embodiment, a customer orders a product via a network using an information processing terminal outside a store in advance (or may be during manned opening hours). During unmanned opening hours, the doorway or the like of the store is locked, and the customer cannot enter the store. However, a robot moves in the unmanned store instead of the customer, sequentially picks and collects ordered products from the display shelf, and conveys the products to a dedicated delivery place. This delivery place includes, for example, a small window and a locker through which the product can be delivered inside/outside the store, and the customer makes cashless payment with electronic money, a credit card, or the like (or completes electronic payment in advance) and receives the product from the delivery place. This enables the store to sell the product in the store without letting the customer in the store even "outside opening hours".

<System Configuration>

Figure 1:
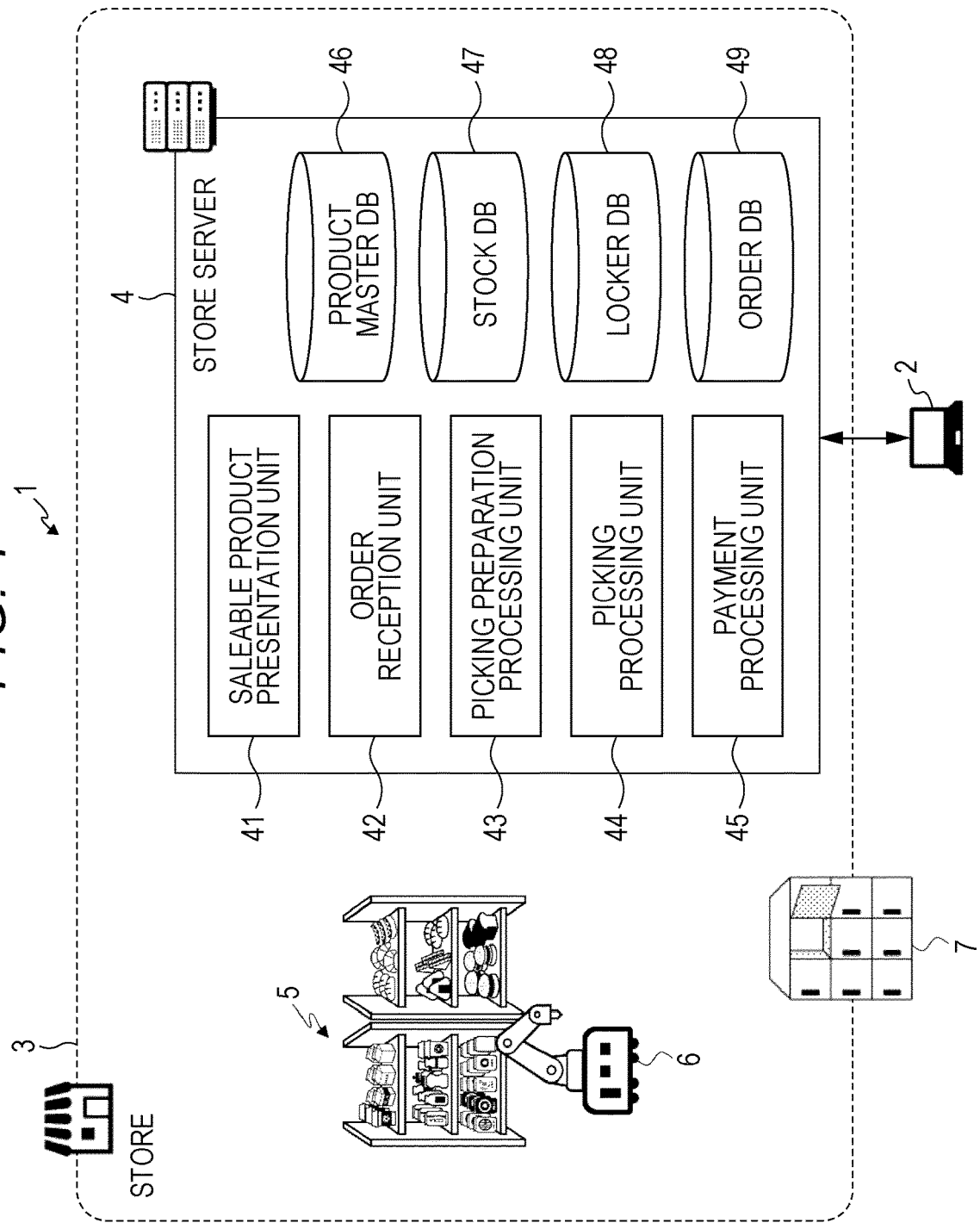
FIG. 1 is a diagram showing an outline of a configuration example of a product sales system that is an embodiment of the present invention.

FIG. 1 is a diagram showing an outline of a configuration example of the product sales system that is an embodiment of the present invention. A product sales system 1 includes, for example, one or more picking robots 6 that pick a product related to an order of a customer from a display shelf 5 and convey the product to a dedicated delivery place while moving in a store 3, a delivery locker 7 as a dedicated place for delivering a product inside/outside the store 3, and a store server 4.

[Picking Robot]

Figure 2:
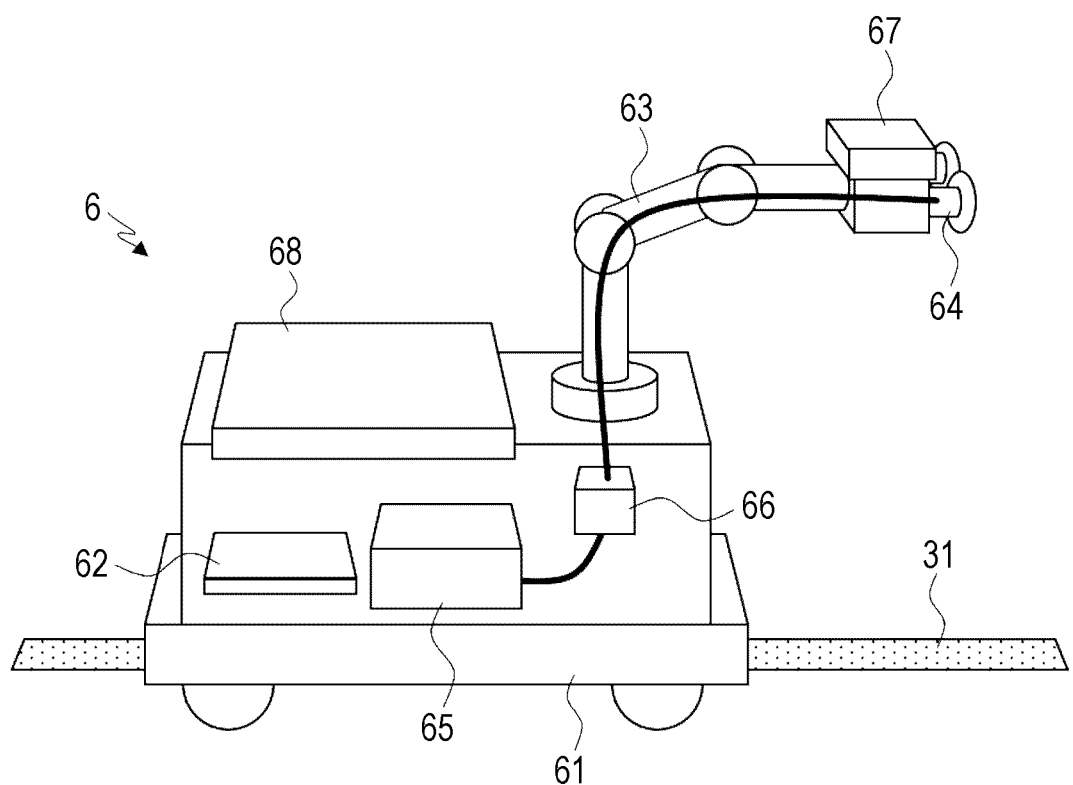
FIG. 2 is a view schematically showing an outline of a configuration example of a picking robot in an embodiment of the present invention.

FIG. 2 is a view schematically showing an outline of a configuration example of the picking robot 6 in an embodiment of the present invention The picking robot 6 includes, for example, each unit such as an automatic guided vehicle (AGV) 61, a control unit 62, an arm 63, a suction pad 64, a vacuum pump 65, an atmospheric barometer 66, a depth sensor 67, and a product conveyance table 68.

For example, the automatic guided vehicle 61 is configured to move and travel along a magnetic tape 31 laid on a floor surface along a passage for accessing the display shelf 5 in the store 3. Specifically, for example, the automatic guided vehicle 61 can be configured by a tracked AGV <XF series> of Sharp Corporation. The present invention is not limited to the one using the magnetic tape, and the automatic guided vehicle 61 may be configured to move and travel while automatically recognizing its own position in the store 3 using a so-called simultaneous localization and mapping (SLAM) technology.

The control unit 62 includes, for example, a central processing unit (CPU), a recording device such as a memory, and a communication device, and communicates with the store server 4 described later via the network to receive an instruction related to picking of a product and provide a notification of a conveyance status. The overall operation of the picking robot 6 is controlled based on an instruction from the store server 4 to perform picking and conveyance of a product from the display shelf 5. After receiving an instruction from the store server 4, the control unit 62 may independently perform the overall control of the picking robot 6 by itself, or may adjust the control content in response to an instruction appropriately received from the store server 4 while communicating with the store server 4 in real time.

The suction pad 64 is attached to the tip end portion of the arm 63 as a product picking means, and the suction pad 64 can be moved to a desired position by flexing and extending each movable portion of the arm 63 based on an instruction from the control unit 62. The suction pad 64 is connected to the atmospheric barometer 66 and the vacuum pump 65 via a hose. A vacuum suction function of the suction pad 64 is achieved by controlling the vacuum pump 65 based on an instruction from the control unit 62 (success or failure of suction can be grasped by the atmospheric barometer 66). Specifically, the arm 63 can be configured by, for example, UR5 of Universal Robots, the suction pad 64 can be configured by, for example, a bell-shaped vacuum pad of Schmalz, and the vacuum pump 65 can be configured by, for example, Linicon LV660 of Nitto Kohki Co., Ltd.

In the present embodiment, two suction pads 64 are provided, but the number of suction pads 64 is not limited thereto. In the present embodiment, a vacuum suction function by the suction pad 64 and the vacuum pump 65 is used as a means for picking a desired product from the display shelf 5, but the picking means is not limited thereto. For example, the picking means may be a mechanical gripping means by a reacher or a mechanism resembling a human hand, or may be a means for scooping up by a mechanism having a shape such as a fork.

The depth sensor 67 is also attached near the tip end portion of the arm 63. The depth sensor 67 is a sensor having a depth detection function and an image-capturing function, and can be specifically configured by, for example, RealSense (registered trademark) Depth Camera of Intel Corporation. As described later, the control unit 62 of the picking robot 6 specifies the position of the picking target product from the display shelf 5 by image recognition by artificial intelligence (AI) from an image of the display shelf 5 photographed by the depth sensor 67. The depth to the target product is grasped based on depth information obtained from the depth sensor 67. The arm 63 and the suction pad 64 are controlled based on these pieces of information to suck and pick the product, and the product is placed on the product conveyance table 68.

The product conveyance table 68 is a member having a role of a "shopping cart" that holds a product picked from the display shelf 5 by the picking robot 6 until the product is conveyed to the delivery locker 7. In the present embodiment, since the placement surface on which the product is placed on the product conveyance table 68 is configured by the belt conveyor, the held product can be easily and smoothly conveyed to the delivery locker 7.

Figure 3A:
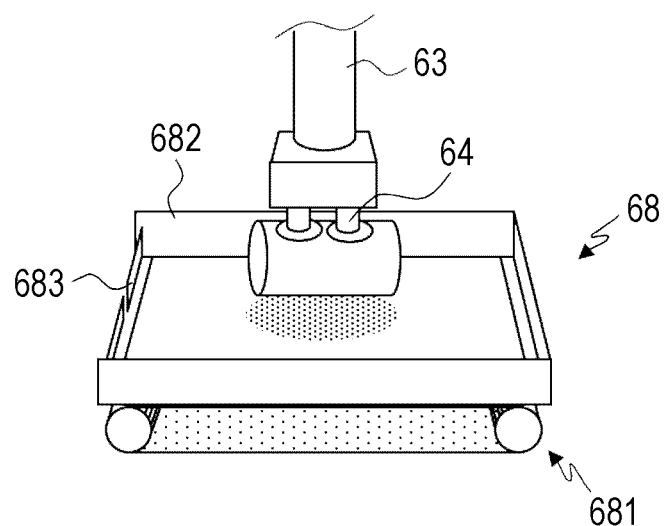
FIGS. 3A and 3B are views schematically showing an outline of a configuration example of a product conveyance table in an embodiment of the present invention.
Figure 3B:
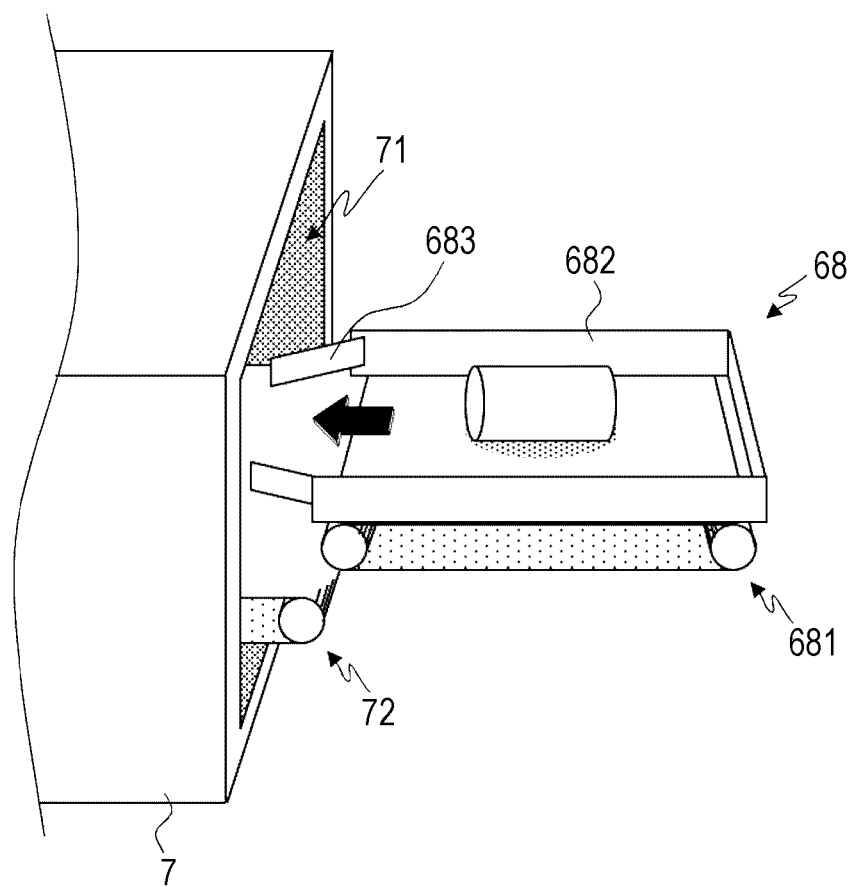

FIGS. 3A and 3B are views schematically showing an outline of a configuration example of the product conveyance table 68 in an embodiment of the present invention. FIG. 3A is a view showing an outline of a configuration example of mainly an excerption of the product conveyance table 68 in the picking robot 6. In the present embodiment, a belt conveyor 681 is used for the placement surface of the product conveyance table 68. Specifically, for example, it can be configured by Mini Mini X2 (MMX2) of Maruyasu Kikai Co., Ltd. The picking robot 6 controls the arm 63 to place the product sucked and picked from the display shelf 5 by the suction pad 64 onto the upper surface (placement surface) of the belt conveyor 681 as illustrated.

A protective wall 682 is provided on the outer periphery of the placement surface of the belt conveyor 681 so that the held product does not fall or the like. Of the four sides of the outer periphery, one side (the left side in the example of FIG. 3A) corresponding to the downstream side of the belt conveyor 681 includes a conveyance gate 683 as a product conveyance port instead of the protective wall 682. At normal times, the conveyance gate 683 is fixed in a closed state as illustrated so that the held product does not fall or the like.

FIG. 3B is a view showing an outline of a configuration example when a product is conveyed from the product conveyance table 68 to a storage space 71 of the delivery locker 7. Similarly to FIG. 3A, FIG. 3B also shows an excerption of the product conveyance table 68 of the picking robot 6. The picking robot 6 moves itself such that the product conveyance table 68 is placed at a position where the product can be conveyed to the desired storage space 71 in the delivery locker 7, and adjusts the height of the product conveyance table 68 by a servo mechanism not illustrated or the like as necessary. Thereafter, the belt conveyor 681 is rotated to move the product held on the upper surface side to the downstream side (the left side in the example of FIG. 3B). At this time, the conveyance gate 683 is opened as illustrated so that the product can come out of the product conveyance table 68.

In the example of FIG. 3B, the conveyance gate 683 is configured to be opened as a double door. However, the present invention is not limited thereto. For example, the conveyance gate 683 may be configured to be opened as a slide door, or may be configured to be opened by moving upward or downward as a whole. The conveyance gate 683 may be configured to open in a form of falling to the outside the product conveyance table 68.

On the other hand, for example, a belt conveyor 72 for receiving a product may be installed as illustrated in a bottom surface portion of the storage space 71 of the delivery locker 7, and rotated in conjunction with the belt conveyor 681 of the picking robot 6, thereby receiving the product coming out from the product conveyance table 68 and moving and conveying the product to the back side of the storage space 71. In this case, for example, the belt conveyor 72 may be controlled so as to start rotation upon detecting, by a sensor not illustrated, that the product is to be received (or has been received), or start rotation upon receiving an instruction from the picking robot 6. It is also possible to adopt a configuration in which the storage space 71 does not include the belt conveyor 72, the picking robot 6 moves and inserts the product conveyance table 68 into the storage space 71, and the products are sequentially placed and come out from the back side.

There is a case where a plurality of various products are placed on the belt conveyor 681 of the product conveyance table 68, and there is a possibility that some products interfere with another product when being conveyed to the storage space 71 of the delivery locker 7 and damage themselves or another product. Therefore, for example, a weight sensor may be installed on the belt conveyor 681 to grasp the total weight of the products held, and the products having a predetermined weight or more may not be held (in this case, for example, all the products related to the order are not conveyed by one picking but are conveyed in a plurality of times).

When the weight distribution and the inclination of the upper surface of the product held on the upper surface of the belt conveyor 681 are detected and the arm 63 is controlled to place the product on the product conveyance table 68, a position where the product is placed may be adjusted to balance as a whole so as to avoid a heavy product from interfering with other products due to movement or rolling. Alternatively, by preferentially placing a heavy product on the downstream side when products are placed on the product conveyance table 68, the heavy product may be conveyed before a light product at the time of conveyance to the storage space 71 so that the heavy product does not interfere with the light product. The attitude when being placed on the product conveyance table 68 may be adjusted in response to shape of the product so as to be as stable as possible.

[Delivery Locker]

Figure 4A:
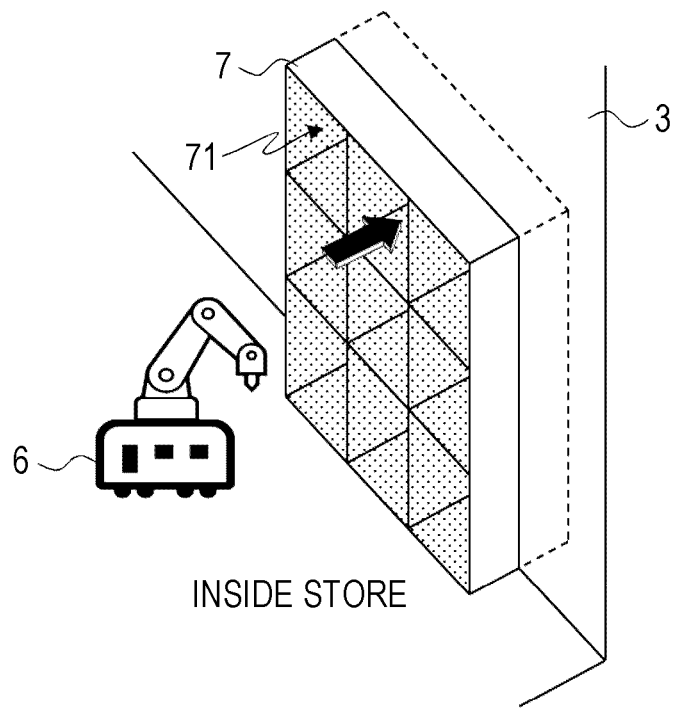
FIGS. 4A and 4B are diagrams schematically showing an outline of an installation example of a locker in an embodiment of the present invention.
Figure 4B:
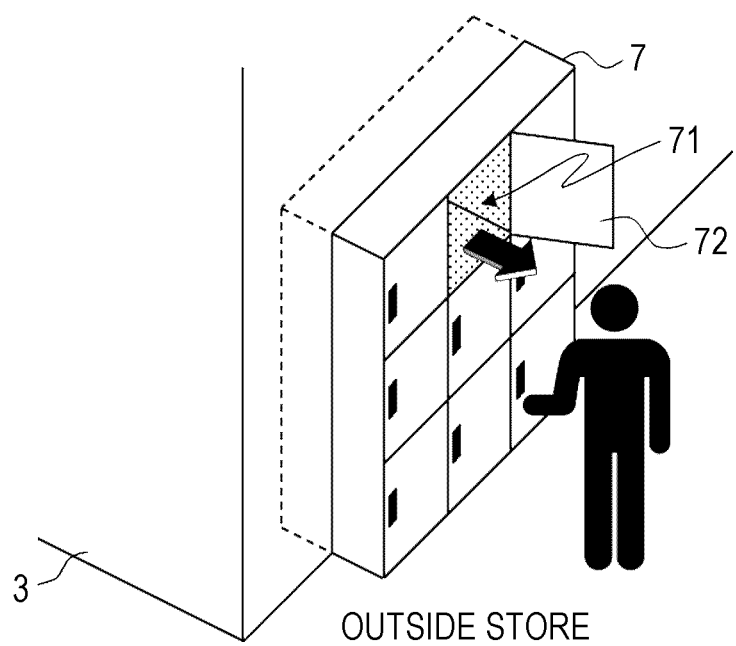

In the present embodiment, the delivery locker 7 as a delivery place of the product with the customer is provided, for example, on a wall surface or a window surface at a position accessible by the customer from the outside of the store 3 (e.g., "a wall surface facing a parking lot on the first floor"). FIGS. 4A and 4B are diagrams schematically showing an outline of an installation example of the delivery locker 7 in an embodiment of the present invention. FIGS. 4A and 4B show an example of 3×3=9 delivery lockers 7 being installed.

FIG. 4A is a diagram schematically showing a state in which the delivery locker 7 installed on the wall surface or the window surface of the store 3 is viewed from the inside of the store. A part of the delivery locker 7 indicated by the dotted line indicates that the part is located outside the store 3. In the example of FIG. 4A, the in-store side of each delivery locker 7 is in an open state without a door or the like, and the product can be freely placed in each storage space 71 from the inside of the store by the method shown in FIG. 3B. However, the present invention is not limited to such a configuration. Each delivery locker 7 includes a door or the like inside of the store, the door or the like is closed at normal times, and thus the storage space 71 cannot be accessed. However, the present invention may be configured so that the door or the like is opened so that the storage space 71 can be accessed when the picking robot 6 conveys the product.

FIG. 4B is a diagram schematically showing a state in which the delivery locker 7 is viewed from the outside of the store. A part of the delivery locker 7 indicated by the dotted line indicates that the part is located inside the store 3. An openable and closable door 72 is provided outside each delivery locker 7. The door 72 can be configured by an electronically lockable and unlockable door that is used in a known electronic locker or the like.

For example, when a near-field communication device such as an IC card reader not illustrated is provided on the out-store side of the delivery locker 7, and the customer holds a mobile terminal having a near-field communication function such as a smartphone associated with the customer over and communicates with the near-field communication device, the door 72 can be unlocked and opened. At this time, if the customer has not completed the advance payment by a credit card or the like, the customer may make a payment here by electronic money and then unlock the door. When the customer opens the door 72 of the delivery locker 7 assigned to his/her order, the product related to the order has already been conveyed to the storage space 71 by the picking robot 6 in the store, and the customer can receive the product from outside the store via the delivery locker 7 without entering the store.

[Store Server]

The store server 4 in the example of FIG. 1 is an information processing system having a function of receiving an order from a customer, giving an instruction for picking from the display shelf 5 of a product related to the order and conveyance of the product to the delivery locker 7, and performing processing of payment by the customer. For example, the store server 4 is implemented by server equipment, a virtual server constructed on a cloud computing service, or the like, and has a configuration in which a customer terminal 2, which is an information processing terminal such as a personal computer (PC) or a smartphone with which the customer performs order processing, is connected via a network such as the Internet not illustrated. The customer terminal 2 may be an information processing terminal owned by the customer himself/herself, or may be a dedicated ordering device or an ordering terminal installed outside the store 3.

For example, by a CPU not illustrated executing an operating system (OS) developed on a memory from a recording device such as a hard disk drive (HDD), middleware such as a web server, and software operating thereon, the store server 4 implements various functions described later related to product sales during unmanned opening hours. This store server 4 includes units such as, for example, a saleable product presentation unit 41, an order reception unit 42, a picking preparation processing unit 43, a picking processing unit 44, and a payment processing unit 45 that are implemented by software. The store server 4 includes data stores such as a product master database (DB) 46, a stock DB 47, a locker DB 48, and an order DB 49 that are configured by a database, a file, and the like.

The saleable product presentation unit 41 has a function of, upon receiving a request from a customer via the customer terminal 2, extracting information on the saleable products during the current or immediate unmanned opening hours among the products displayed on the display shelf 5 of the store 3 and presenting the information to the customer terminal 2. For example, the information is displayed as a list of products available for sale on a web browser not illustrated or a dedicated application on the customer terminal 2 via a web server program not illustrated or the like. The products may be narrowed down and displayed based on the condition designated by the customer.

When extracting the saleable products, based on information in the product master DB 46 and the stock DB 47 described later, for example, products whose display quantity is zero, i.e., products not currently displayed on the display shelf 5 (the same is true because the product cannot be sold during the unmanned opening hours unless there is a mechanism for replenishing the product from the stock to the display shelf 5 in an unmanned manner even in a case where there is stock in a backyard, a warehouse, or the like), and products that cannot be sold or not suitable in an unmanned manner due to the nature of the product are excluded from the saleable products.

Whether or not a product cannot be sold or not suitable in an unmanned manner due to the nature of the product can be set in advance in the product master DB 46 as attribute information of each product itself. For example, it is conceivable that unmanned sales is impossible or not suitable in the first place in relation to the nature of the product itself or the specifications and performance of the picking robot 6, such as a product that may be at risk of spilling liquid or damaging the product at the time of conveyance, or a product that the picking robot 6 cannot (or difficult to) pick because the product is too small in size or irregular in shape.

Furthermore, for example, a product having a weight exceeding a predetermined upper limit value may be excluded from products available for unmanned sales, or a product having a price higher than a predetermined upper limit value may be excluded from saleable products from the viewpoint of security and crime prevention. A product for which picking is practically impossible or difficult because the picking robot 6 cannot access due to the location of the display shelf 5, the display position in the display shelf 5, and the type (refrigerator, freezer, heat insulation case, and the like) of the display shelf 5 on which the product is displayed, for example, based on the information in the stock DB 47 although it is not necessarily impossible to perform unmanned sales due to the attribute of the product itself may be excluded from saleable products.

The order reception unit 42 has a function of receiving, from the customer terminal 2, order information including information regarding the product and its quantity and payment that the customer gave an instruction to purchase from among the saleable products displayed on the customer terminal 2, and recording the order information in the order DB 49 described later.

The picking preparation processing unit 43 has a function of performing preparation processing for the picking robot 6 to actually perform picking for the order received by the order reception unit 42. The preparation processing includes, for example, processing of assigning the delivery locker 7 to be used for delivery of the product to the customer. The usage status of each delivery locker 7 is recorded in the locker DB 48 described later. The preparation processing also includes processing of acquiring information regarding each product related to the order from the product master DB 46 or the stock DB 47, and determining a movement route of the picking robot 6 sequentially picking each product from the display shelf 5 up to conveying the products to the delivery locker 7.

Figure 5:
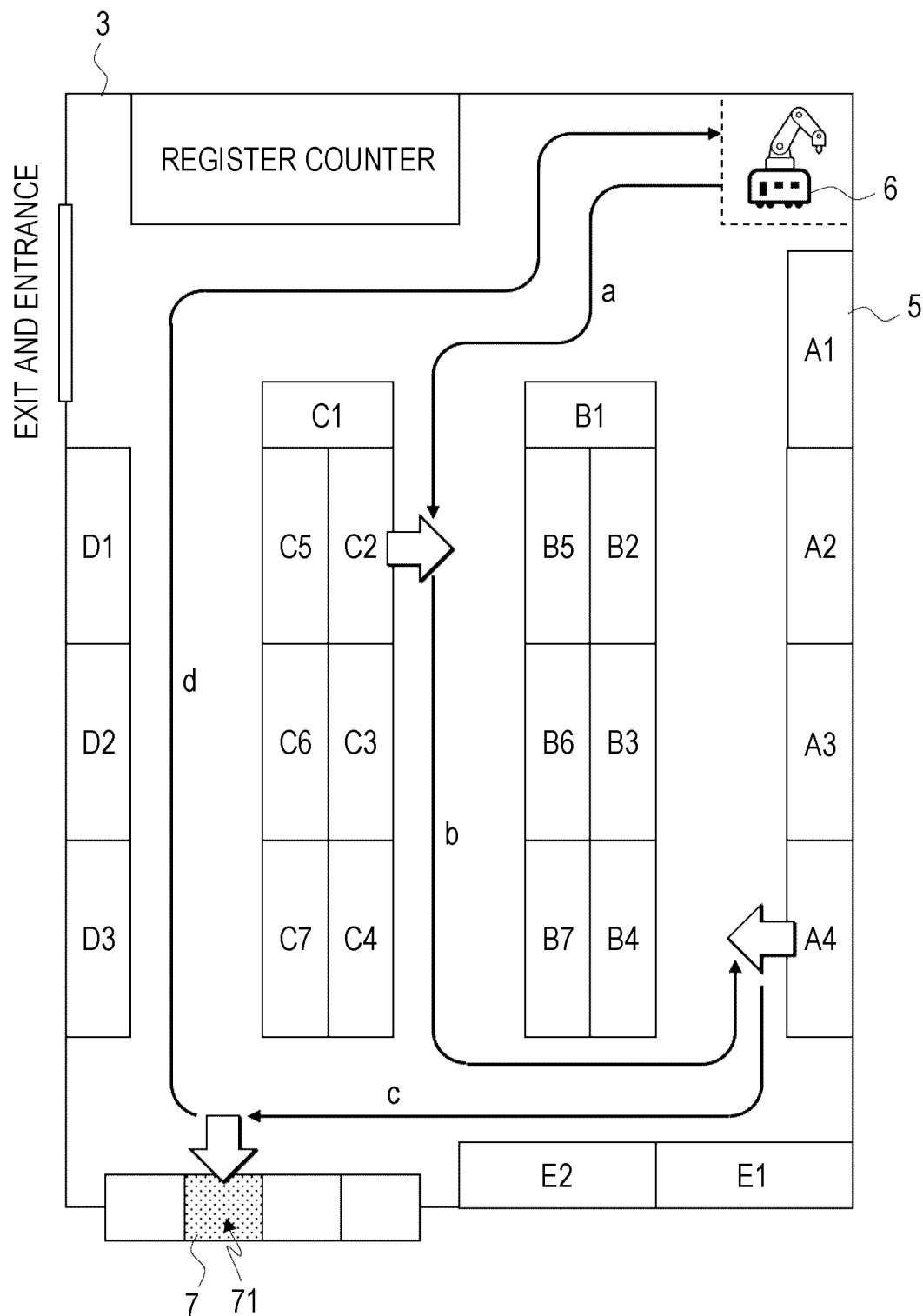
FIG. 5 is a diagram schematically showing an outline of an example of a movement route of the picking robot in an embodiment of the present invention.

FIG. 5 is a diagram schematically showing an outline of an example of a movement route of the picking robot 6 in an embodiment of the present invention. The example of FIG. 5 shows a plan view of the inside of the store 3, and shows that a plurality of display shelves 5 ("A1" to "A4", "B1" to "B7", "C1" to "C7", "D1" to "D3", and "E1" and "E2") and a plurality of delivery lockers 7 are installed. This also shows that the picking robot 6 waits at a predetermined waiting place. With reference to the stock DB 47, the picking preparation processing unit 43 of the store server 4 that is not illustrated grasps which display shelf 5 the product related to the order is displayed on, and searches and determines, based on the position of each product on the display shelf 5, a movement route from picking each product, conveying the product to the delivery locker 7, up to returning to the waiting place.

The movement route is desirably the shortest route, but is not necessarily the shortest route. For example, in a case where a plurality of products is picked, the order of picking may be adjusted according to the type of the products, and the movement route may be determined according to the order. In addition, one movement route may be determined for a plurality of orders (or a plurality of customers). In this case, different delivery lockers 7 are assigned to each order, but a plurality of orders from the identical customer may be collectively conveyed to one delivery locker 7.

FIG. 5 shows, by a curved arrow, an example of a movement route in a case where the product related to the order is a product displayed on the display shelf 5 of "A4" and "C2". According to this movement route, the picking robot 6 first moves to the display shelf 5 of "C2" through the route of the arrow "a", and picks the target product from here and places it on the product conveyance table 68. Thereafter, the picking robot 6 further moves to the display shelf 5 of "A4" through the route of the arrow "b", and picks the target product and places it on the product conveyance table 68. Thereafter, the picking robot 6 moves to the delivery locker 7 (hatched part in the figure) assigned to the customer through the route of the arrow "c", and conveys the product placed on the product conveyance table 68 into the storage space 71 by the belt conveyor 681. Thereafter, the picking robot 6 returns to the predetermined waiting place through the route of the arrow "d".

Returning to FIG. 1, the picking processing unit 44 has a function of performing an instruction/command related to a series of processing of moving the picking robot 6 according to the movement route determined by the picking preparation processing unit 43, sequentially picking the products displayed on the display shelf 5, conveying the products to the assigned delivery locker 7, and returning to the waiting place, and of managing the status of the picking. As described above, necessary information (information on the picking target product and the display shelf 5, information on the display position of the display shelf 5, the assigned delivery locker 7, the movement route, and the like) related to the series of picking processing may be first transmitted collectively to the picking robot 6, and thereafter, the picking robot 6 may autonomously perform the picking processing, or an instruction may be sequentially performed while communicating with the picking robot 6 in real time or in a state equivalent thereto as needed.

When the picking robot 6 picks a desired product from the display shelf 5 (in the present embodiment, the product is sucked by the suction pad 64), it is necessary to specify where on the display shelf 5 the product is displayed. In general, regarding where on the display shelf 5 the product is displayed in the store 3, it is possible to set in advance to fix as to which level (hereinafter, referred to as a "display level", e.g., "upper level", "middle level", and "lower level") of a shelf to display the product. However, it is considered not possible to set in advance at which position (e.g., "n-th from left") on the display level to display the product, or even if it is possible, it is fluid and the position is changed thereafter in many cases.

Therefore, in the present embodiment, display position information up to which display level of which display shelf 5 each product is displayed is held in a database (e.g., the product master DB 46 and the stock DB 47 described later), meanwhile at which position on the display level each product is actually displayed is grasped in real time based on information obtained by the depth sensor 67 of the picking robot 6. That is, the vicinity of the target display level is photographed by the depth sensor 67, the target product is identified and specified by image recognition processing by AI based on the image-capturing data, and the position (up, down, left, right, and depth) and attitude thereof are grasped by using depth information. This enables the target product to be identified and specified and its display position to be grasped even in a case where the display position of the product is shifted or the product tilts or falls.

Figure 6:
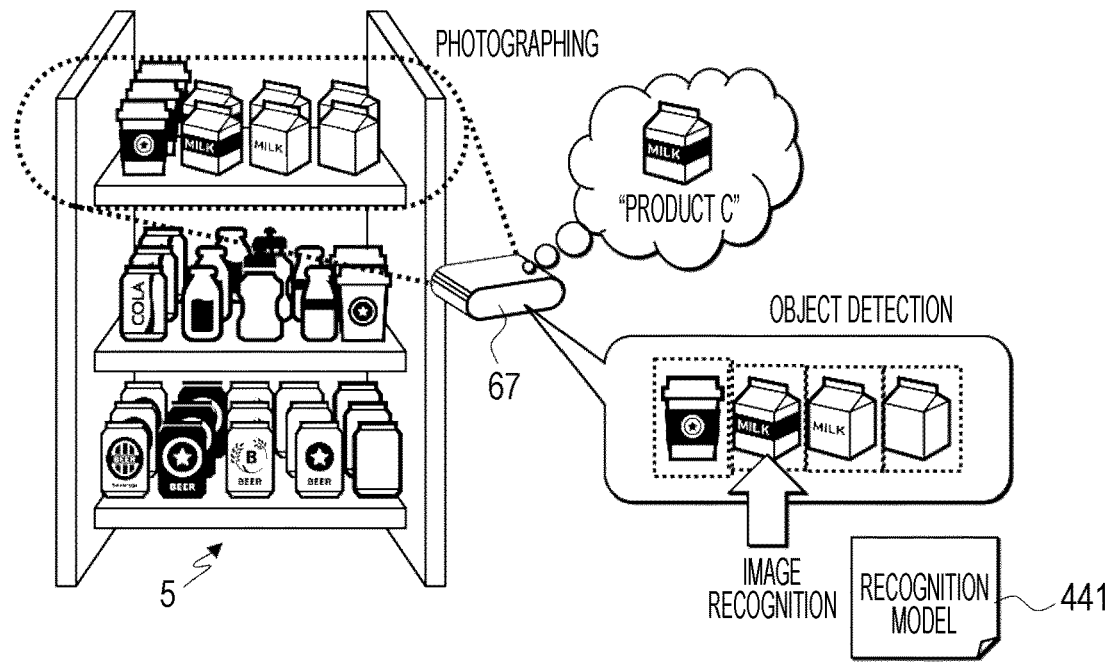
FIG. 6 is a diagram showing an outline of an example of a method of specifying a display position of a product in a display shelf in an embodiment of the present invention.

FIG. 6 is a diagram showing an outline of an example of a method of specifying the display position of a product in the display shelf 5 in an embodiment of the present invention. FIG. 6 shows an example of a case where the picking target product is a "product C" and the display level in the display shelf 5 is the upper level. The picking robot 6 that has moved to the vicinity of the display shelf 5 photographs the vicinity of the upper level of the display shelf 5 by the depth sensor 67. Then, object detection (in the example of FIG. 6, four objects surrounded by the dotted square are detected) is performed by using a known contour extraction technique or the like on the photographed image, image recognition by AI is performed on each detected object, and an object matching the "product C" is specified.

A recognition model 441, which is a learning model used by the AI at this time, is learned and generated in advance based on image data or the like photographed for each product of sales target in the store 3, and is held in the store server 4. The image recognition processing by AI may be performed by the picking processing unit 44 of the store server 4, or may be performed by the control unit 62 of the picking robot 6 by itself by acquiring the recognition model 441 from the store server 4. The AI engine, library, and the like to be used are not particularly limited, and generally available known ones can be appropriately used.

[Grasp of Product by Image Recognition]

Figure 7A:
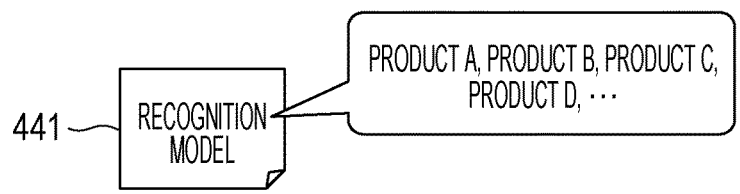
FIGS. 7A and 7B are diagrams showing an outline of an example of a method of image recognition in an embodiment of the present invention.
Figure 7B:
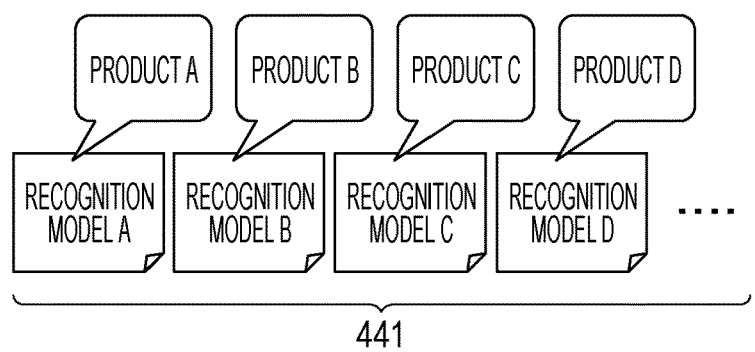

FIGS. 7A and 7B are diagrams showing an outline of an example of the method of image recognition in an embodiment of the present invention. FIG. 7A shows a method of creating and applying one recognition model 441 that can identify all products displayed on, for example, one shelf (one level) of the display shelf 5 as a target (in the example in the figure, "product A", "product B", "product C", "product D", . . . ). In this case, which product each object is identified by sequentially applying this recognition model 441 to each object identified by image processing such as contour extraction from the image of the display level.

Such a method of image recognition is common. However, in a chain such as a convenience store, for example, in many cases, products handled are similar for each store 3, but the lineup and display position of the product displayed on each display shelf 5 and display level are different, and eventually, it is necessary to individually create the recognition model 441 for each store 3. In this case, no problem is raised if the number of stores 3 is small or if the position, type, and the like of the products to be displayed on the display shelf 5 are not frequently changed. However, as the number of stores 3 increases, a burden of handling increases, which is unrealistic.

Therefore, in the present embodiment, as shown in FIG. 7B, a method of creating the recognition model 441 for identifying each product is adopted. In this case, the recognition model 441 created for each product is applied to each object identified by image processing such as contour extraction from the image of the display level, thereby identifying which object to be the target product. In this method, since the recognition model 441 is created for each product, for example, it can be collectively created in advance at the headquarters of a convenience store chain and provided to each store 3 as one of the product information held in the product master DB 46. This enables each store 3 to use as it is the recognition model 441 created for each product, regardless of which display level of which display shelf 5 each product is displayed. This can greatly reduce a burden related to creation and preparation of the recognition model 441, and can also improve product identification accuracy by image recognition.

In order to identify the picking target product from among the objects identified from the image of the display level, for example, the recognition model 441 for the target product is acquired, and is sequentially applied to each object to be discriminated by AI, and the object having the highest score can be determined as the target product. In the present embodiment, in order to further enhance the accuracy, the recognition model 441 of each product (also including other products displayed on the display level in addition to the picking target product) displayed in a target display level is acquired, and the recognition model 441 of each product is sequentially applied for each object to be discriminated by AI, thereby determining a product having the highest score to be the product related to the object. Information on another product displayed on the target display level can be grasped from the stock DB 47, for example.

In general, products similar in size, shape, pattern, color, and the like, such as similar products of the same type or identical products but different in type, grade, and the like, are often displayed side by side on the display level. Therefore, in order to further improve the identification accuracy of the product, in addition to each product displayed on the target display level, the recognition model 441 related to a product similar in appearance to these products may be acquired and applied together to further improve the accuracy. Information on other products having a similar appearance for each product can be set and registered in advance in the product master DB 46, for example.

In order to perform processing of identifying a picking target product from each object identified by image processing such as contour extraction, it is necessary to acquire the recognition model 441 of each product (that may include a product having an appearance similar to that of the target product) including other products displayed on the target display level as described above. For these recognition models 441, regardless of whether the image recognition processing is performed by the picking robot 6 or performed by the picking processing unit 44 of the store server 4, including the case of picking a plurality of products, in the present embodiment, at a time point when the picking robot 6 moves and approaches the target display shelf 5 by a predetermined distance, the recognition model 441 of a product (other products displayed in the same display level, products similar in appearance, and the like) related to the picking target product from the display shelf 5 is specified and acquired as needed. However, the present invention is not limited thereto. At the initial stage of the series of picking processing, all the recognition models 441 required later may be specified and acquired in advance.

For example, in a case where the image recognition processing is performed by the picking robot 6, the recognition model 441 once acquired from the store server 4 may be held as a history in association with the target product or the display shelf 5. Thus, in a case where a product that has been picked once is picked again by another order, it is possible to avoid a burden of acquiring, from the store server 4 by communication again, the recognition model 441 that has already been acquired once. Since the arrangement of the products displayed on the display shelf 5 is basically not changed during unmanned opening hours, the recognition model 441 of the products displayed on each display shelf 5 can be reused for the display shelf 5.

<Data Configuration>

FIG. 8 is a diagram showing an outline of an example of the data configuration of the product master DB 46 in an embodiment of the present invention. The product master DB 46 is a table that holds master information regarding each product sold in the store 3, and includes, for example, items such as a product ID, a product name, a type, a unit price, a weight, unmanned sales availability, a recognition model, and a similar product ID.

The item of product ID holds identification information such as an ID and a number for uniquely identifying each product. The items of the product name, the type, and the unit price hold the name of the target product, information on the name and the code value for identifying the type of product (e.g., "cup noodles" and "detergent"), and information on a sales unit price of the target product. The item of weight holds information on the weight per sales unit of the target product. The item of unmanned sales availability holds information such as a flag indicating whether or not to make the target product a target of the unmanned sales according to the present embodiment. This can forcibly set the target product to be excluded from the unmanned sales target.

The item of recognition model holds information on the recognition model 441 for identifying the target product by image recognition by AI. The item of recognition model may hold the recognition model 441 itself, or may hold instruction information such as a path or a link to the recognition model 441 managed in a file or another recording medium. The item of similar product ID holds the product IDs of other products in a case where other products similar in appearance to the target product exist (a plurality of them may exist).

FIG. 9 is a diagram showing an outline of an example of the data configuration of the stock DB 47 in an embodiment of the present invention. The stock DB 47 is a table that holds information related to the stock and display status of each product sold in the store 3, and includes, for example, items such as a product ID, a stock quantity, a display quantity, a display shelf ID, and a display level.

The item of product ID is identification information such as an ID for uniquely identifying each product, and has the same content as the item of the product ID in the product master DB 46 described above. The item of stock quantity holds information on the stock quantity at the time point in the store 3 of the target product. The item of display quantity holds information on the display quantity on the display shelf 5 at the time point in the store 3 of the target product. In a case where the display quantity is zero, the product is supposed to be replenished from the stock and displayed unless the stock quantity is zero in the manned opening hours, but the product is treated as a missing product unless there is a means such as unmanned replenishment and display by the robot or the like during the unmanned opening hours.

The item of display shelf ID holds identification information such as an ID and a number (e.g., "C2" in the example of FIG. 5) for specifying the display shelf 5 on which the target product is actually displayed in a case where the value of the display quantity described above is not zero. By referring to this information, the picking robot 6 can move to the target display shelf 5. When the value of the display quantity is not zero, the item of display level holds information (e.g., "upper level", "middle level", "lower level", "first level", "second level", and "third level") for identifying the display level on which the product is actually displayed in the display shelf 5 specified by the item of the display shelf ID described above. With this item, it is possible to grasp as to which product is displayed on a specific display level in addition to which display level the target product is displayed.

FIG. 10 is a diagram showing an outline of an example of the data configuration of the locker DB 48 in an embodiment of the present invention. The locker DB 48 is a table that holds information such as availability and usage status of the delivery locker 7 installed in the store 3, for example, and includes items such as a locker number, a status, a status update date and time, and an order ID.

The item of locker number holds identification information such as a number or an ID for uniquely identifying each delivery locker 7 installed in the store 3. With this locker number, it is possible to specify the position (e.g., "n-th of the n-th level" in the configuration as in the example of FIGS. 4A and 4B) of the delivery locker 7. However, an item for holding information for specifying the position of the delivery locker 7 may be separately provided.

The item of status holds information such as a character string and a code value indicating the availability or the like (e.g., "vacant", "assigned", and "conveyed") of the target delivery locker 7. For an order from a customer, the delivery locker 7 to be used for delivery of the product in the order is assigned from those whose items indicate "vacant". The item of status update date and time holds information on a time stamp when the value of the item of status described above is last updated. For example, in a case where a predetermined time or more has elapsed since the status has become "conveyed", a notification or the like prompting the target customer to take out the product may be performed. When the status of the target delivery locker 7 is "assigned" or "conveyed", the item of order ID holds information on the ID of the order to which the delivery locker 7 is assigned. This order ID has the same content as the item of the order ID in the order DB 49 described later.

FIG. 11 is a diagram showing an outline of an example of the data configuration of the order DB 49 in an embodiment of the present invention. The order DB 49 is a table that holds information related to the content of an order from a customer, for example, and includes items such as an order ID, a user ID, a product ID, a purchase quantity, a payment amount, a payment status, an order date and time, a corresponding robot ID, a scheduled delivery date and time, and an order status, for example.

The item of order ID holds identification information such as an ID and a serial number for uniquely identifying each order in the target store 3. The item of user ID holds identification information such as an ID for uniquely identifying the account of the customer who has made the target order. The items of the product ID and the purchase quantity hold information on a product ID for specifying the product of which an instruction on purchase is given in the target order and its quantity, respectively. The item of product ID has the same content as the item of the product ID in the product master DB 46 described above. In a case where purchase of a plurality of products is instructed in a target order, these items are held for each product on which an instruction is given.

The items of payment amount and payment status hold information on the total payment amount in the target order and information on a flag indicating whether or not the payment by the customer has been completed, respectively. The item of order date and time holds information on a time stamp when the store server 4 received a target order. The item of corresponding robot ID holds identification information such as an ID and a number for specifying the picking robot 6 assigned to perform picking of the product and conveyance to the delivery locker 7 regarding the target order. The item of scheduled delivery date and time holds information on a date and time estimated by the picking processing unit 44 of the store server 4 or the like as a scheduled date and time when conveyance to the delivery locker 7 by the picking robot 6 regarding the target order is completed and the customer can receive the product. The item of order status holds information such as a character string and a code value indicating a status (e.g., "ordered", "conveyed", and "delivered") of the target order.

<Flow of Processing>

Figure 12:
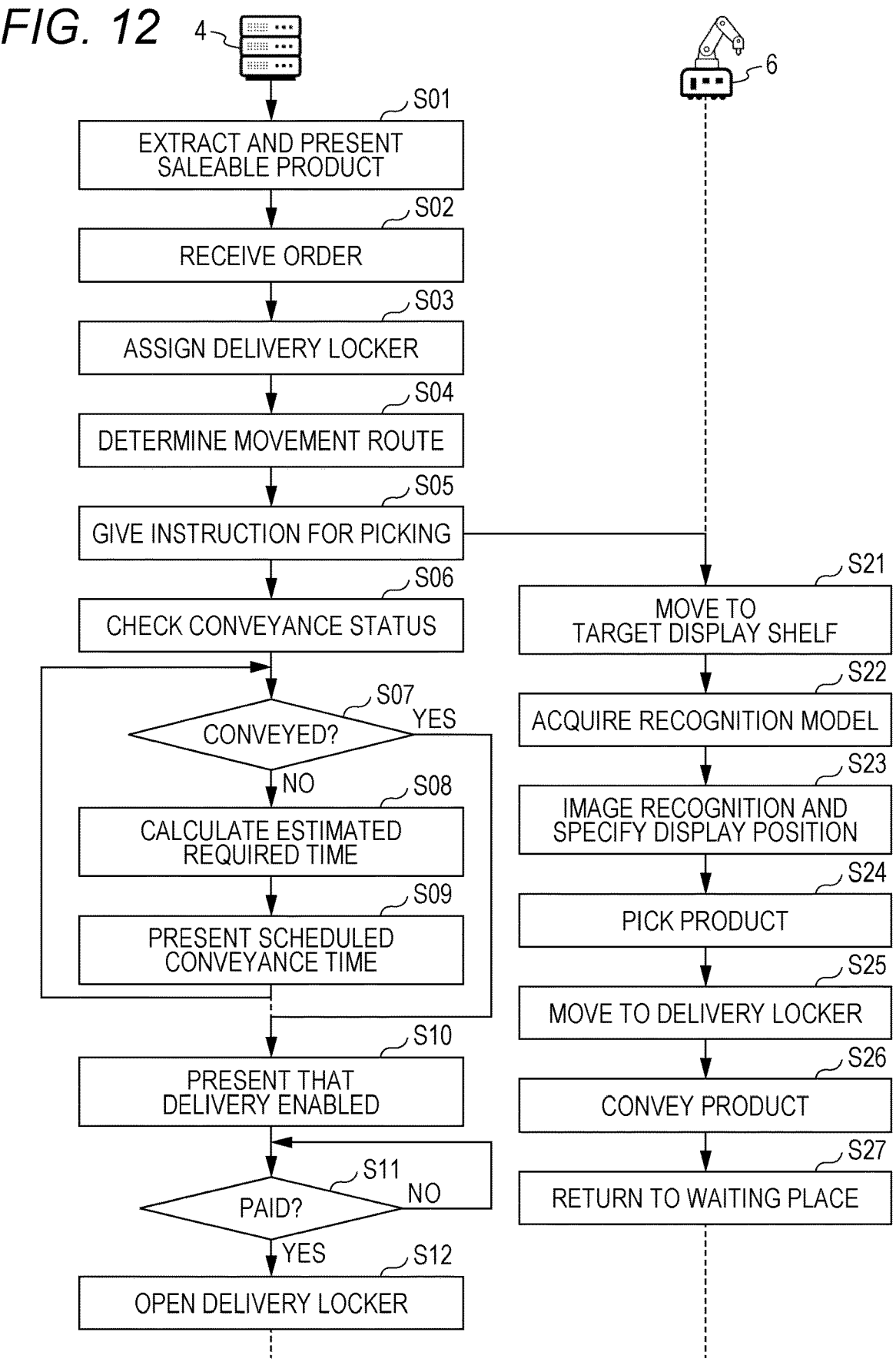
FIG. 12 is a processing flow diagram showing an outline of an example of a flow of product sales processing in an embodiment of the present invention.

FIG. 12 is a processing flow diagram showing an outline of an example of the flow of product sales processing in an embodiment of the present invention. First, in the store server 4, with reference to the product master DB 46 and the stock DB 47, the saleable product presentation unit 41 extracts a product that can be sold (ordered) during unmanned opening hours, i.e., a product of a type that is available for unmanned sales and is actually displayed on the display shelf 5, and presents this product to the customer via the customer terminal 2 (S01). In the customer terminal 2, a web browser, a dedicated application, or the like displays a saleable product, and when the customer designates a desired product, a payment method, or the like and gives an instruction on purchase, order information is sent to the store server 4. The order reception unit 42 of the store server 4 receives the order information sent from the customer terminal 2 and records the order information into the order DB 49 (S02).

Upon receiving the order, with reference to the locker DB 48, the picking preparation processing unit 43 assigns the delivery locker 7 in the "vacant" state to be used for delivery of the product in the order (S03). In a case where there is no vacancy in the delivery locker 7, the customer terminal 2 may be notified of the fact, and if the customer desires, the order may be canceled. If the customer does not cancel, the assignment may be performed after waiting until the delivery locker 7 becomes available. In this case, completion of conveyance of the product to the delivery locker 7 is delayed, and as a result, the time when the customer can receive the product is delayed. When the delivery locker 7 is assigned, the picking preparation processing unit 43, as preparation for picking, determines a movement route in which the picking robot 6 sequentially picks each product related to the order from the display shelf 5, conveys the product to the delivery locker 7, and returns to the waiting place (S04).

Thereafter, by wireless or wired communication, the picking processing unit 44 of the store server 4 instructs the picking robot 6 to perform picking (S05). The instruction content of picking includes at least information on the picking target product, information on the delivery locker 7 assigned in step S03, and information on the movement route determined in step S04. After the picking instruction is given, the product conveyance status (S06) is periodically checked, and it is determined whether or not the conveyance status has become "conveyed" (S07). The conveyance status may be determined by, for example, whether or not the item of order status in the order DB 49 has become "conveyed", or information on the conveyance status may be acquired by inquiring the picking robot 6 each time.

If the conveyance status is not "conveyed" in step S07, it is determined that picking is still in progress, and the picking processing unit 44 calculates the estimated required time for the conveyance status to become "conveyed" (S08), obtains the scheduled time for the conveyance status to become "conveyed" by adding the estimated time to the current time, and presents the scheduled time to the customer via the customer terminal 2 (S09). Thereafter, the process returns to step S07 to repeat the processing.

The estimated required time can be approximated, for example, based on the time required for the picking robot 6 to move along the movement route (calculated from the distance of the movement route and the movement speed of the picking robot 6), the time required for the picking robot 6 to pick the product after moving to the target display shelf 5 (calculated from the time required for image recognition processing, the time required for the picking robot 6 to move the arm 63 to a desired position, and the like), the time required for the picking robot 6 to convey the product from the product conveyance table 68 to the storage space 71 of the delivery locker 7 (calculated from the rotation speed, size, and the like of the belt conveyor 681), and the like.

When the conveyance status becomes "conveyed" in step S07, it is determined that the conveyance of the product to the delivery locker 7 is completed, and the picking processing unit 44 presents to the customer via the customer terminal 2 the fact that the delivery of the product to the customer has become enabled due to the completion of the conveyance (S10). When the customer visits the store 3 and attempts to unlock and open the target delivery locker 7 from outside the store, with reference to the order DB 49, the payment processing unit 45 of the store server 4 determines whether or not the payment status of the target order is "paid" (S11). As described earlier, the payment may be made online with a credit card or the like in advance, or may be made on the spot by electronic money or the like at the delivery locker 7.

When the payment status is not "paid", the processing of step S11 is repeated until the payment status becomes "paid". When the payment status becomes "paid", the door 72 of the delivery locker 7 is unlocked and opened (S12). When the customer takes out the product from the storage space 71 and closes the door 72, the delivery locker 7 notifies the store server 4 of the fact, and the store server 4 updates the item of order status of the order in the order DB 49 to "delivered", thus the series of processing is terminated.

On the other hand, when a picking instruction is issued from the store server 4 to the picking robot 6 in step S05 described above, the picking robot 6 moves from the predetermined waiting place to the target display shelf 5 according to the movement route on which an instruction is given (S21). At that time, at the stage when the picking robot 6 moves to the vicinity of the target display shelf 5, the recognition models 441 of all the products (that may further include products similar in appearance to the target product) displayed on the display level on which the picking target product is displayed in the target display shelf 5 are acquired from the store server 4 (S22). The necessary recognition model 441 may be acquired from the store server 4 each time at the stage when the picking robot 6 moves to the vicinity of the display shelf 5 in this manner, or the recognition models 441 necessary for all the products related to the order may be acquired in advance when receiving the instruction of picking in step S05.

Thereafter, when the picking robot 6 moves to the target display shelf 5, the picking robot 6 controls the position of the depth sensor 67 by moving the arm 63 regarding the display level on which the picking target product is displayed, photographs an image, and specifies the display position of the target product on the display level by image recognition by AI (S23). Then, the picking robot 6 controls the position of the suction pad 64 by moving the arm 63, sucks and picks the product by the suction pad 64, and places the product onto the product conveyance table 68 (S24).

More specifically, when the picking robot 6 moves to the front of the target display shelf 5, the picking robot 6 determines the position to arrange the depth sensor 67 such that the entire products on the display level falls within the image-capturing possible range of the depth sensor 67 according to the height of the display level on which the picking target product is displayed and the width of the display level, moves the arm 63 to arrange the depth sensor 67 at the target position, and photographs an image of the display level. Then, based on the photographed image, the position of the picking target product is specified by the method of image recognition as shown in the example of FIG. 6 described earlier.

When the position of the picking target product is specified, a relative positional relationship between the target product and the suction pad 64 installed at the tip end portion of the arm 63 is calculated based on the position information and the depth information of the position obtained by the depth sensor 67. From the calculated positional relationship, the control unit 62 of the picking robot 6 generates a movement trajectory for bringing the suction surface of the suction pad 64 into contact with the target product, i.e., for moving the suction surface to a position where picking can be performed, and moves the arm 63 to move the suction pad 64 according to the generated movement trajectory. Thereafter, the vacuum pump 65 is turned on to suck the target product to the suction pad 64, and in this state, the arm 63 is moved to move the suction pad 64 to a desired position on the product conveyance table 68. Then, the vacuum pump 65 is turned off, and the product is separated from the suction pad 64 and placed onto the product conveyance table 68.

If there is a plurality of types of products included in the target order, the processing of steps S21 to S24 described above is repeated for each target product as necessary. If an instruction on purchase of a plurality of identical products is given, the processing of steps S23 and S24 described above is repeated as many times as the number of products where necessary. When all the products included in the order are picked, the picking robot 6 moves to the delivery locker 7 assigned in step S03 described above regarding the order (S25), and conveys the product from the product conveyance table 68 to the storage space 71 of the delivery locker 7 by the method shown in the example of FIGS. 3A and 3B (S26). Thereafter, the picking robot 6 returns to the predetermined waiting place according to the movement route determined in step S04 described above (S27), and the series of processing is terminated.

As described above, according to the product sales system 1, which is one embodiment of the present invention, even in a situation where the store 3 is locked or the like during unmanned opening hours and the customer cannot enter the store 3, the picking robot 6, instead of the customer, moves around inside the unmanned store 3, sequentially picks and collects ordered products from the display shelf 5, and conveys the products to the delivery locker 7. This enables products actually displayed on the display shelf 5 to be sold even "outside opening hours" while reducing security and crime prevention risk without allowing customers to enter the store 3.

Since the display position, attitude, and the like of the product related to the order are identified by image recognition by AI from the photographed image of the display level in the target display shelf 5, it is possible to identify the display position of the target product regardless of the actual display status of the product. By preparing the recognition model 441 to be used for image recognition not in units of display levels but for each product, for example, even in a convenience store or the like having a large number of member stores, if the recognition model 441 for each product is prepared in advance in the headquarters, it is not necessary to individually create and prepare the recognition model 441 in accordance with an actual product display situation in each store 3, and it becomes possible to easily deploy the product sales system 1 to a large number of stores 3.

By using the belt conveyor 681 as the product conveyance table 68 of the picking robot 6, the product can be easily and smoothly conveyed to the delivery locker 7. Furthermore, by providing the belt conveyor 72 also in the storage space 71 of the delivery locker 7, it becomes possible to more smoothly convey the product.

The invention carried out by the present inventor has been specifically described based on the embodiment. However, it is needless to say that the present invention is not limited to the above-described embodiment but can be modified in various manners in a rage without deviating from the gist of the present invention. The above embodiment has been described in detail in order to explain the present invention in an understandable manner, and the present invention is not necessarily limited to one including all the configurations described. Another configuration can be added to, deleted from, and replaced with a part of the configuration of the above-described embodiment.

A part or all of the above-described configurations, functions, processing units, processing means, and the like may be implemented by hardware by being designed as an integrated circuit or the like. Alternatively, the above configurations, functions, and the like may be implemented by software by a processor interpreting and executing a program that implements each function. Information such as programs, tables, and files for implementing each function can be stored in a recording device such as a memory, a hard disk, and a solid state drive (SSD), or in a recording medium such as an IC card, an SD card, and a DVD.

The above drawings show control lines and information lines that are considered necessary for the description, and do not necessarily show all the implemented control lines and information lines. In reality, almost all the configurations may be considered mutually connected.

The present invention can be used in a product sales system that sells products in an unmanned real store.

What is claimed is:

1. A product sales system that sells a product displayed on a display shelf in a store to a customer outside manned opening hours of the store, the product sales system comprising:
    a store server that includes an information processing system; and
    a picking robot that is movable in the store, wherein the store server includes:
        an order reception unit that receives an order of a product from an information processing terminal of the customer via a network, and
        a picking processing unit that instructs the picking robot to pick the product related to the order from the display shelf and convey the product to a predetermined delivery place,
    the picking robot includes:
        an arm that is able to move a tip end portion to a desired position,
        a picking means for picking a product, the picking means being installed at the tip end portion of the arm, and
        a sensor having an image-capturing function, the sensor being installed near the tip end portion of the arm,
    the picking robot:
        moves to the display shelf on which the product related to the order is displayed based on identification information for specifying the display shelf stored in a database,
        photographs, by the sensor, an image of a display level of the display shelf on which the product related to the order is displayed,
        detects one or more objects by image processing from the photographed image of the display level of the display shelf on which the product related to the order is displayed,
        identifies the product related to the order among the one or more objects and a position of the identified product related to the order by image recognition processing of the photographed image based on a recognition model set for each product with respect to each object,
        moves the picking means to the identified position of the identified product related to the order, and
        picks up the identified product related to the order by the picking means, and
    the picking robot
        acquires the recognition model set for a product related to the order from the store server when the picking robot moves for a predetermined distance toward the display shelf on which a product related to the order is displayed.

2. The product sales system according to claim 1, wherein the picking robot sequentially applies, to each of the objects detected by image processing, the recognition model set for each product displayed on the display level, and identifies which product each of the objects is.

3. The product sales system according to claim 1, wherein the picking robot sequentially applies, to each of the objects detected by image processing, the recognition model set for each product related to the order and each product similar in appearance to the product, and identifies which of the objects the product related to the order is.

4. The product sales system according to claim 1, wherein the sensor is a depth sensor, and the picking robot identifies up, down, left, right, depth and attitude of the one or more objects by using depth information obtained by the depth sensor.

* * * * *